United States Patent
Forman et al.

(10) Patent No.: US 12,523,387 B1
(45) Date of Patent: Jan. 13, 2026

(54) METHOD AND SYSTEM FOR CONTROLLING THE DISTRIBUTION OF THERMALLY ALTERED FLUIDS

(71) Applicant: Suncourt, Inc., Durant, IA (US)

(72) Inventors: David J Forman, Coralville, IA (US); Dean A. Kostan, Lake in the Hills, IL (US)

(73) Assignee: Suncourt, Inc., Durant, IA (US)

( * ) Notice: Subject to any disclaimer, the term of this patent is extended or adjusted under 35 U.S.C. 154(b) by 459 days.

(21) Appl. No.: 17/831,689

(22) Filed: Jun. 3, 2022

Related U.S. Application Data

(63) Continuation of application No. 17/580,859, filed on Jan. 21, 2022, now abandoned.

(60) Provisional application No. 63/140,112, filed on Jan. 21, 2021.

(51) Int. Cl.
 *F24F 11/64* (2018.01)
 *F24F 11/77* (2018.01)
 *G05B 19/042* (2006.01)
 *F24F 110/10* (2018.01)

(52) U.S. Cl.
 CPC ............. *F24F 11/64* (2018.01); *F24F 11/77* (2018.01); *G05B 19/042* (2013.01); *F24F 2110/10* (2018.01); *G05B 2219/2614* (2013.01)

(58) Field of Classification Search
 CPC ........ F24F 11/77; F24F 11/64; F24F 2110/10; G05B 2219/2614
 See application file for complete search history.

(56) References Cited

U.S. PATENT DOCUMENTS

| | | | |
|---|---|---|---|
| 2011/0283448 A1* | 11/2011 | Kenoyer | G05D 23/19 4/541.3 |
| 2018/0292102 A1* | 10/2018 | Mowris | F24F 11/46 |
| 2019/0368764 A1* | 12/2019 | Forman | F04D 29/665 |
| 2020/0247219 A1* | 8/2020 | Kleinow | B60H 3/0085 |

* cited by examiner

*Primary Examiner* — Vincent H Tran
(74) *Attorney, Agent, or Firm* — Simmons Perrine PLC

(57) ABSTRACT

A logic control scheme for a booster (fan or pump) that synchronizes its operation with a fluid distribution system (air or water) in which the temperature of the distributed fluid rises or falls as part of an ordinary system cycle. This rise or fall in temperature is considered an actionable event for the booster apparatus and the booster must respond by starting or stopping its operation. This method uses "learning" algorithms to improve the operation of the booster based on data gathered during operation. This method monitors the immediate rate of change in system temperature and bases its activation or deactivation on an increased rate of change in absolute system temperature relative to the previously sampled rate.

5 Claims, 20 Drawing Sheets

METHOD AND SYSTEM FOR CONTROLLING THE DISTRIBUTION OF THERMALLY ALTERED FLUIDS

CROSS REFERENCE TO RELATED APPLICATIONS

The present application is a continuation of the non-provisional patent application having Ser. No. 17/580,859 filed on Jan. 21, 2022, which application claims the benefit of the filing date of provisional patent application having Ser. No. 63/140,112 filed on Jan. 21, 2021 by the same Applicant with the same inventors, which application is incorporated herein in its entirety by this reference.

FIELD OF THE INVENTION

The present invention generally relates to HVAC fan-forced air register boosters and more particularly relates to methods and systems for automatically turning off the same.

BACKGROUND OF THE INVENTION

In the past, such boosters have utilized a thermostatic control which turns a fan in the booster on and off depending upon whether a sensed temperature is above or below a user controlled setpoint with a "deadband" around the setpoint to prevent small instantaneous changes in temperature from starting and stopping the booster in an undesired manner. The Equalizer Register Booster Fan HC300, available from Suncourt Inc. (www.suncourt.com) has operated in such a manner for many years.

While the Equalizer Register Booster Fan HC300 has enjoyed much success over the years, its design for turning off the booster forces the end-user to choose between a problematic situation at either the beginning or the end of the forced-air cycle of an HVAC system. With a lower setpoint (e.g. just above room temperature), the fan in the booster, hereafter "booster fan", will turn on sooner after the furnace has started and the rise in duct temperature is sensed. But the booster fan will continue to operate long after the furnace has stopped since it will take many minutes for the duct temperature to fall below the setpoint again. This extended run-time can be a nuisance especially since the booster fan, now moving duct air without the assistance of the central air handler, operates against a higher static pressure and the perceivable fan noise is increased. With a higher setpoint (closer to maximum furnace temperature), the booster fan will wait several minutes before turning on, but it will turn off soon after the furnace has stopped. During that extended period of inoperability at the beginning of the cycle, the booster fan is impeding airflow to the room which can exacerbate the very problem of inadequate airflow the booster was designed to address.

Consequently, there exists a need for improved methods and systems for efficiently and easily controlling the operation of boosters.

SUMMARY OF THE INVENTION

It is an object of the present invention to improve the ease of operation and effectiveness of boosters.

It is a feature of the present invention to turn the booster fan on and off with the aid of information other than a magnitude of deviation of a sensed duct temperature from a predetermined maximum or minimum temperature value.

It is another feature of the present invention to turn on and off a booster fan with the aid of information relating to a change in the rate of change in sensed duct temperature relative to a previously sampled rate of change of temperature.

It is yet another feature of the present invention to provide an ability to determine whether a booster is in a blower phase or a purge phase.

It is an advantage of the present invention to avoid inefficiencies resulting from operation of a booster after a loss of synchronization event.

It is another advantage of the present invention to require no user initiated temperature setpoint to operate.

It is another advantage of the present invention to require no seasonal adjustments.

It is another advantage of the present invention not to require a user initiated setting of a "sensitivity level."

It is another advantage of the present invention to require no learning algorithms to achieve its initial synchronization with the distribution system but rather uses this data to improve performance using data gathered during past operation It is an advantage of the present invention to require no direct communication with the central heating/central cooling equipment, or controllers thereof in order to achieve its synchronization.

It is another advantage of the present invention to operate reliably with a reduced amount of effort or skill required of the End-User.

It is another advantage of the present invention to interlock without the need for providing feedback such as a temperature display to aid the End-User in making their adjustments to the booster's operation.

It is another advantage that the booster does not need to acclimate to ambient temperature before turning on or installing the unit. While that may help it to synchronize with the HVAC system quicker, it will not affect the longer term operation of the unit.

Accordingly, the present invention is a method of improving performance of a distribution system of thermally altered fluid, comprising the steps of: providing an electric device configured for causing thermally altered fluid to move more quickly at a location in said distribution system;
  providing a temperature sensor for sensing a temperature characteristic of said thermally altered fluid at said location; and
  wherein said electric device is configured to turn off in response to a determination that a change in a current rate of change of said temperature characteristic has occurred.

Additionally, the present invention is a system for changing a flow rate of fluid in a system for distributing thermally altered fluids, the system comprising:
  a vessel for moving a thermally altered fluid;
  the vessel having an output end;
  an electric device sized, located and configured to increase a flow rate of thermally altered fluid from said output end;
  wherein said electric device is configured to change a state of powered operation if
  a predetermined change of a derivative of a current temperature characteristic, as a function of time, of said thermally altered fluid in said vessel has occurred.

Additionally, a HVAC system comprising:
  an air temperature changing system;
  a duct to said air temperature changing system;
  said duct having an input end and an output end;

a register booster for assisting air to move out of said
output end;
a temperature sensor for sensing a temperature characteristic of air in said duct and generating a variable temperature signal; and
a fan control which makes a determination using information from past operations over a period of time:
to pre-bias a decision; or
to adjust a threshold, which is not initiated by an end user of said register booster.

BRIEF DESCRIPTION OF THE DRAWINGS

The invention may be more fully understood by reading the following description of the preferred embodiments of the invention, in conjunction with the appended drawings wherein.

DETAILED DESCRIPTION

Although described with particular reference to HVAC duct registers boosters, the systems and methods of the present invention can be implemented in many different types of devices and systems to be used with systems for distributing thermally altered fluids.

In an embodiment, the system and method of the present invention described herein can be viewed as examples of many potential variations of the present invention which are protected hereunder. The following details are intended to aid in the understanding of the invention whose scope is defined in the claims appended hereto.

Figure 1:
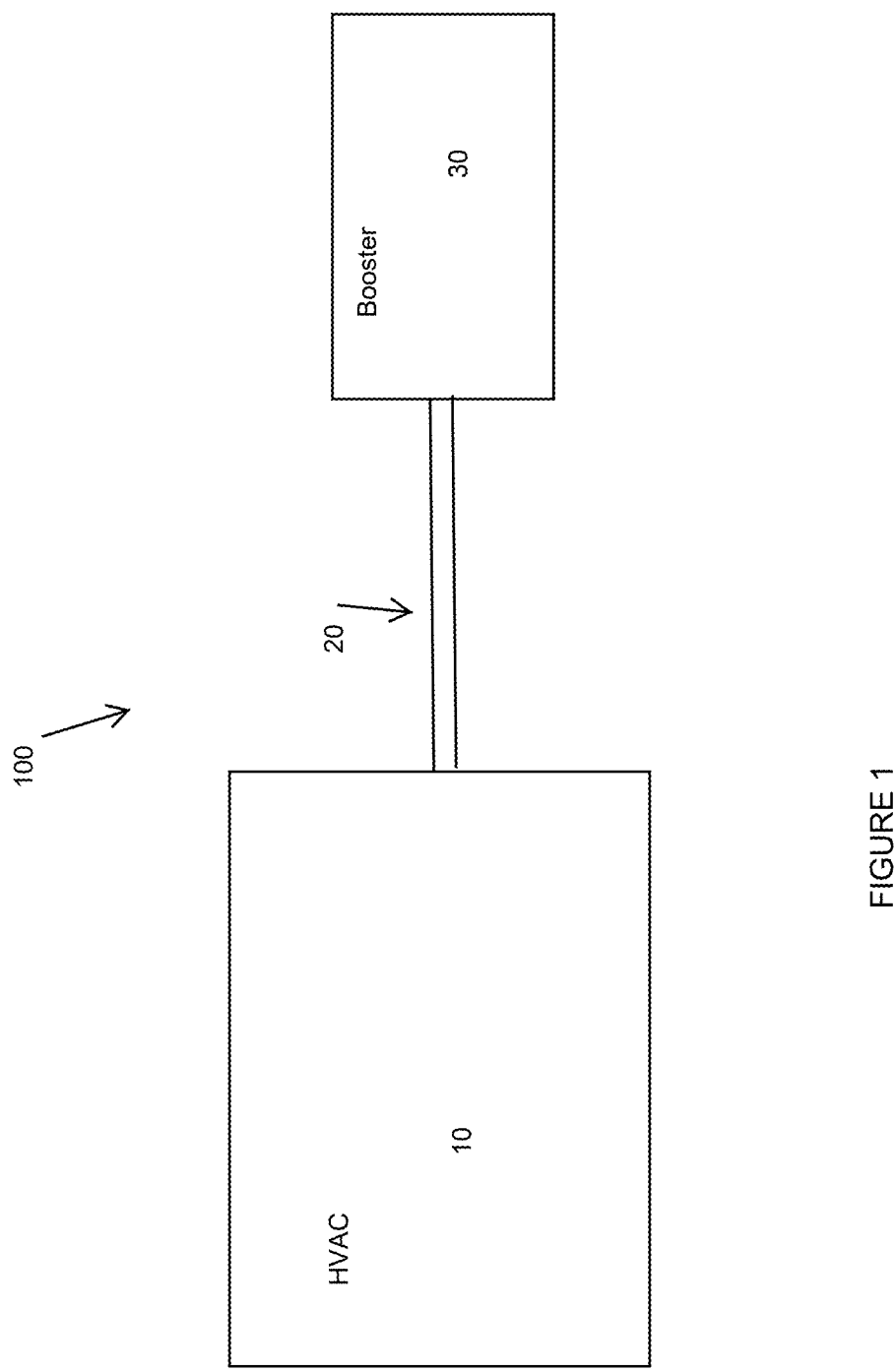
FIG. 1 is a simple block diagram of the system of the present invention.

Now referring to the drawings wherein like numerals refer to like matter throughout, and more particularly in FIG. 1, there is shown a block diagram of the system 100 of the present invention which includes a heating, ventilation, and air conditioning (HVAC) system 10 and a distribution system 20 and a booster 30.

HVAC 10 may be all, any one of, or any combination of a heating system, ventilation system, and air conditioning systems. The present description is focused on a combined HVAC with forced air output. The distribution system 20 would in such an embodiment be an air duct or a system of air ducts. The booster 30 is key aspect of the present invention which may be identical in many ways to the prior art Suncourt HC300 except with novel features relating to control systems for turning of the booster fan 36 (FIG. 2) from an on state to an off state.

Figure 2:
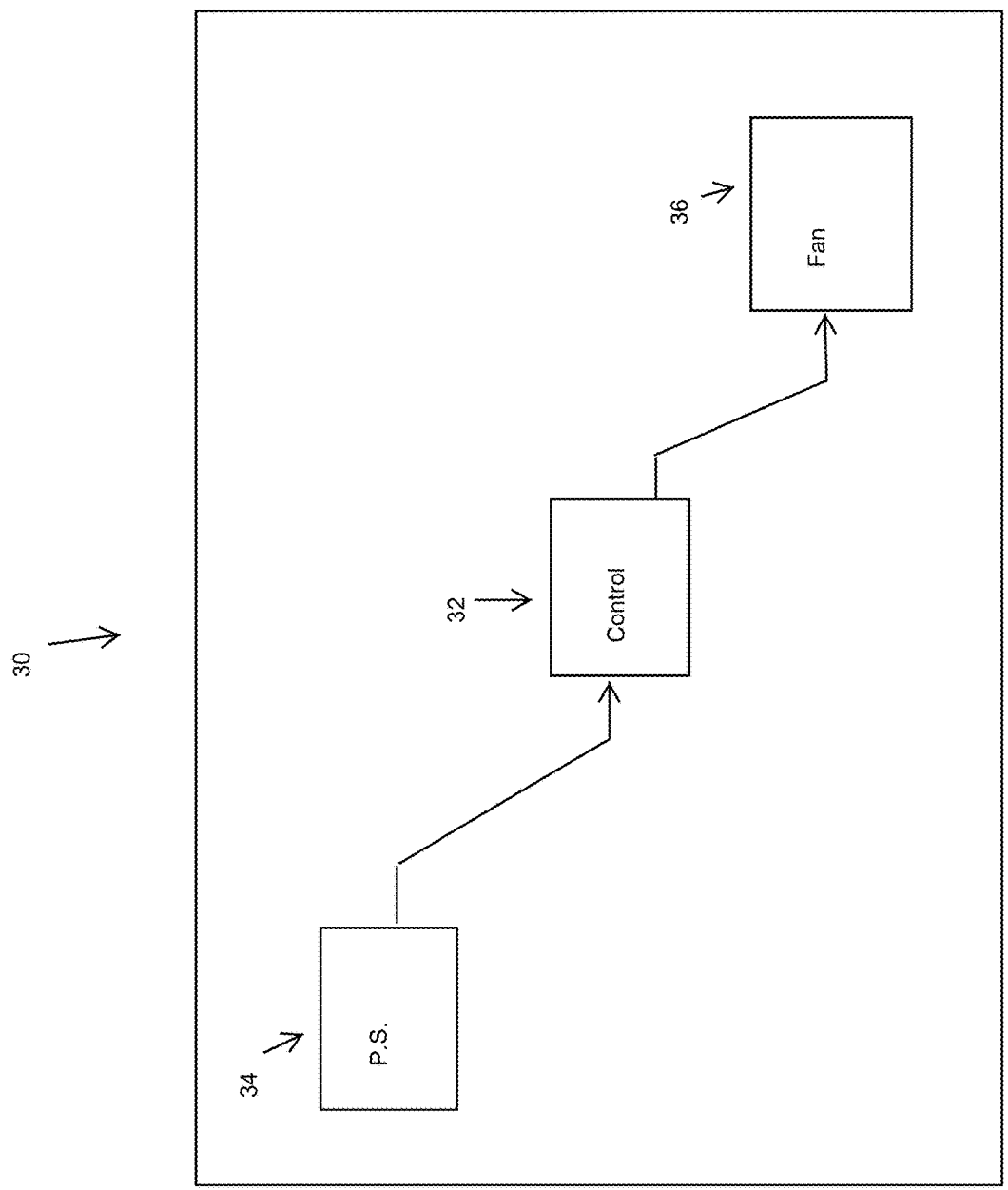
FIG. 2 is a simple block diagram of the booster 30 of FIG. 1.

Now referring to FIG. 2, there is shown a more detailed block diagram of the booster 30 which includes a centrally coupled control system 32, a power supply 34 and at least one electric fan 36.

The first embodiment of the invention is described with reference to FIGS. 3-13 and a second embodiment is described with reference to FIGS. 14-19. Both first and second embodiments are based on similar concepts of monitoring the changes to a rate of change of the system temperature as measured by a thermistor in the stream of thermally altered fluid in a fluid distribution system.

Figure 3:
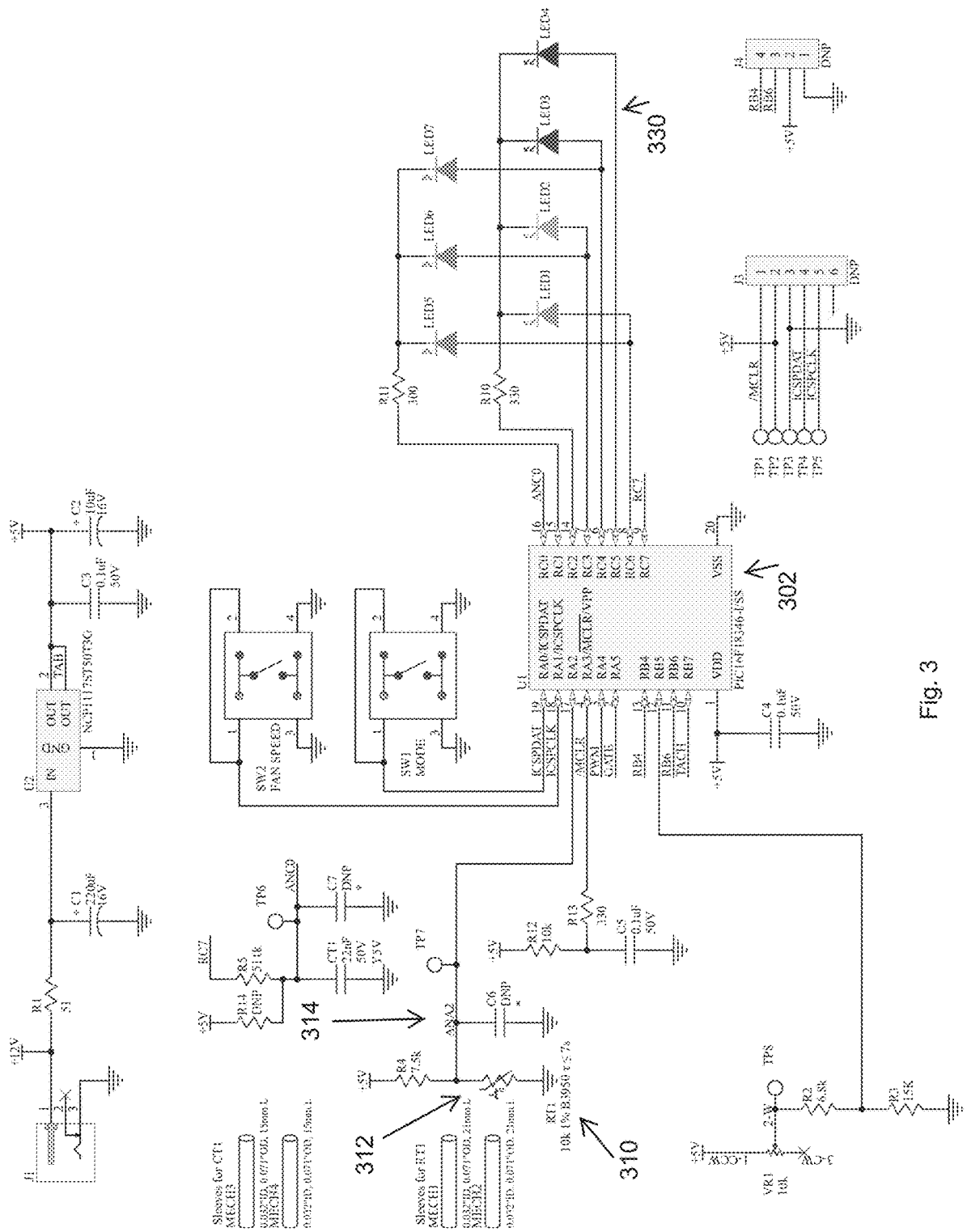
FIG. 3 is a detailed schematic diagram of portions of the system of FIG. 2.
Figure 20:
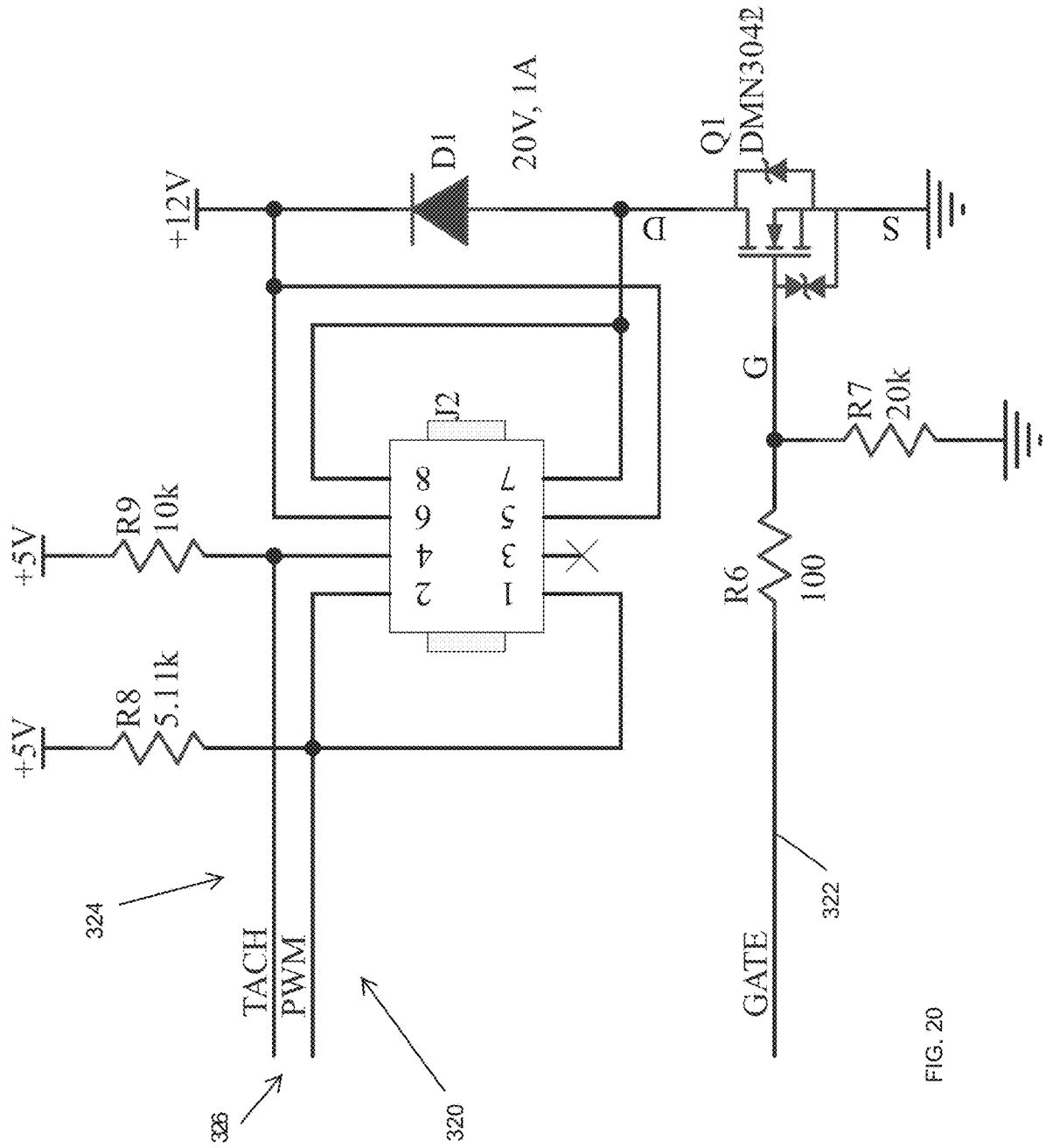
FIG. 20 is a detailed schematic diagram of portions of the system of FIG. 2.

Now referring to FIGS. 3 and 20, there is shown an electronic schematic diagram of the first embodiment of the present invention. The electric device of the first embodiment includes among other things, a connection to:
a temperature sensor system 310, including thermistor 312, and signal out line 314;
a microcontroller 302, LED display 330; and
an electric fan power provisioning and control switch system 320 with a gate 322, pulse width modulator line, 326 and tach line 324. The microcontroller may be located in a common housing with the electric fan, or the control system for the electric device may be located outside of the electric device housing in a manner where electric communications are possible.

Now referring to FIGS. 4, 5, 6 and 7, there is shown flow diagrams which explain the details of a novel method of the first embodiment of the present invention in the detection of the beginning and end of either a heating or cooling cycle, without any setpoints, user initiated seasonal adjustments or threshold settings. Readings from a thermistor, representing the thermistor temperature, are evaluated filtered and analyzed every two seconds as an input to the processing flow. The flow illustration is organized such that flow is from top to bottom and left to right.

The algorithm takes a single input, the thermistor reading, from the system. A new value/sample is made available every two seconds to the algorithm for processing. Faster rates of processing have low utility because of the slow nature of changing temperatures in the application, however could be used and does not impact the algorithm. The processing on the input consists of:

Filter the temperature sample to remove noise from the signal.

Compute the derivative (rate of change) of the temperature. This signal is then filtered in an attempt to help remove ambient temperature change variants due to other factors in the home/HVAC system.

The filtered rate of temperature change is a signal that can have negative and positive values if the temperature drops or increases respectively. The negative and positive peaks are detected and filtered such that the "envelope" of these signals can be computed as the "ave max positive d'T/dt", and "ave max negative d'T/dt".

The average maximum positive d'T/dt, and average maximum negative d'T/dt are summed to produce a signal that is an indication of the whether the algorithm thinks the system is in heat mode versus cooling mode. Note that in heat mode the booster fan is turned on when the temperature rises and turned off when the temperature falls. The opposite is true of cool mode operation. This "instantaneous" computation of the heat/cool detection is one factor in the decision of when to turn on the booster fan.

Figure 4:
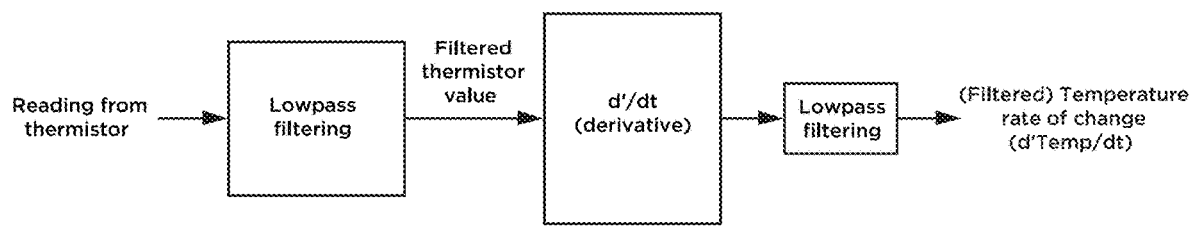
FIGS. 4, 5, 6 and 7 are flow diagrams illustrating steps of the detection of the beginning and end of either a heating or cooling cycle.
Figure 5:
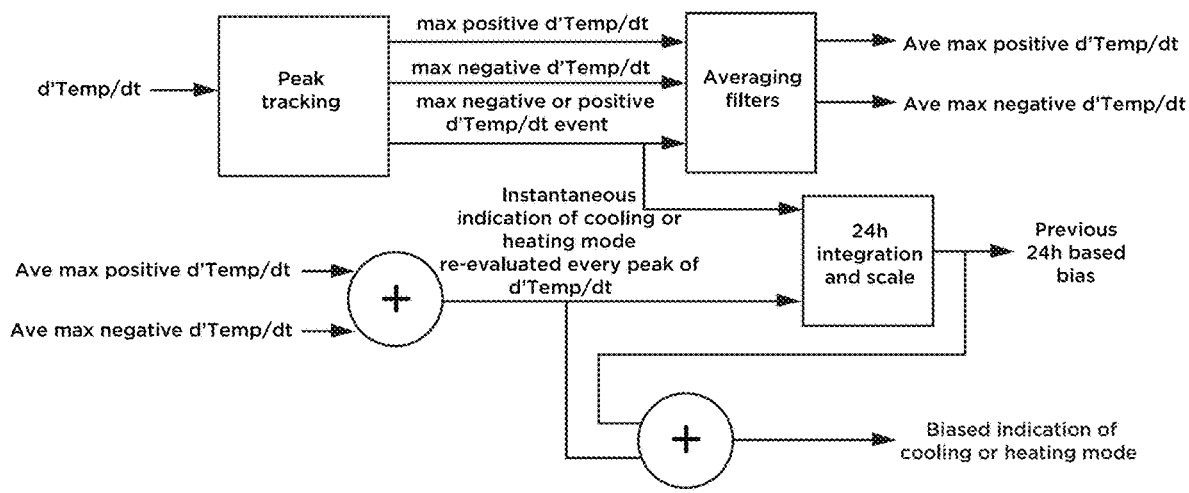
Figure 6:
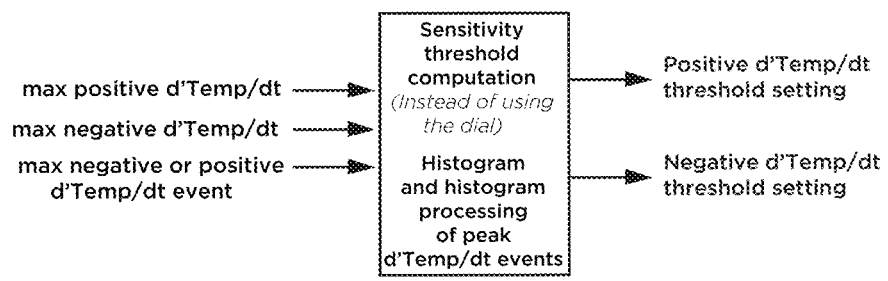
Figure 7:
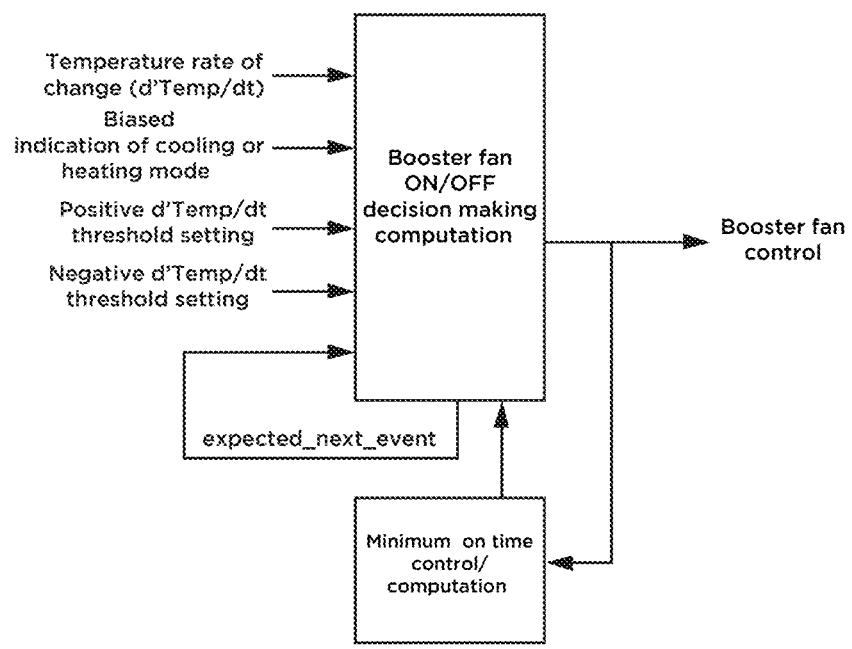

The sum of the average maximum positive d'T/dt, and average maximum negative d'T/dt is also integrated over a 24 hour period and scaled. This is done to produce a learned bias to be added to the "instantaneous" computation to produce the final heat/cool mode detection decision. Over a 24 hour period, the averaging of the peak magnitude of the positive and negative d'T/dt can be used to determine if in cooling or heating mode since on average the rates of change for the blower phase will be greater than the purge stage. This is true on average but there are cases for poor vents, the target for vent booster products, at times the opposite may be true. This is shown in FIG. 4 as the two circled sections of the green signal which is the difference of the average maximum positive d'T/dt, and average maximum negative d'T/dt.

The peak maximum positive d'T/dt, and peak maximum negative d'T/dt are used as inputs to a histogram function that uses a 24 hour period to determine optimal thresholds for peak sensitivity thresholds used in the decision process for control of the vent booster's fan. The histogram period of 24 hours could be extended or shortened if desired but 24 hours is a reasonable setting given the alignment with a normal day period since a vent on average typically sees all of the conditions it will be exposed to within a 24 hour period. The threshold could also come from a dial if more user interaction was desired but the histogram approach produces a very low interaction with the user requirements for the products use and creates a "fully" automatic mode.

The filtered rate of change (d'T/dt), biased indication of the system mode (heating or cooling), and the histogram based threshold for rate of change sensitivity are used to compute the fan control mechanism.

The expected next event is also fed back into the algorithm to inhibit accidental double detections, or oscillations of state, and allows the state machine to switch focus to looking for opposite of the current action that just took place. For instance, if a blower state was just detected, then purge cycle would be looked for next. This variable starts with a "don't know" setting when the algorithm first starts and converges to the correct state when the instantaneous estimate of the system state is determined (usually within a couple of cycles).

Layered onto the control as described above a minimum on time function is used to improve the booster performance for very poor vents for when turning on the fan results in the temperature rate of reversing in sign temporarily. The booster SW used the following logic when adjusting the minimum on time:

It will not use the "minimum on time rule" unless the average on time (also tracked) drops below a certain threshold. The unit employs a hysteresis function such that once the "minimum on time rule" is engaged, it will not disengage it until the average on time goes above a certain threshold. This was done to avoid possible oscillations in the use of the rule.

The minimum on time setting is adjusted upwards from a minimum (set in the code) by an incremental amount of time if the SW detects that the last two out of three "on times" (also tracked) are the same value of the minimum on time current setting. This is repeated up until the minimum on time setting reaches a maximum limit set in the code.

Every week the unit will subtract an incremental amount from the minimum on time setting if it's greater than the minimum on time minimum value/initial setting. This is a slow process but was added such that as the conditions change through seasons (or other) the unit could adapt back to lower on time if needed/applicable, without user intervention/power cycle.

Currently the Minimum ON Time algorithm employs the following settings based on empirical testing as a middle ground for what the unit will encounter in the field. They are easy to adjust in the code.

2.5 minutes as the minimum on time minimum/initial setting.
4.5 minutes as the minimum on time maximum values.
Hysteresis low limit for rule engagement=5 minutes.
Hysteresis high limit for rule disengagement=9 minutes.
10 seconds minimum on time setting increment value.

It is important to note that in the event synchronization is lost for some reason, it will recover as long as the estimation of the mode, cooling or heating, is correct. Some active control systems like Nest and perhaps others, can cause certain conditions (including short cycles), known to cause issue with other algorithms. The combinations of the filtered peak rate of change for a stable instantaneous system estimation and a 24 hour bias application allow the system to recover in those cases and not to get stuck in a long term loss of synchronization.

It is import to also note that while this description describes a HVAC booster fan it is also applicable to fluids other than heated or cooled air, e.g. heated or cooled liquids pumped to remotely located radiators, etc. The application of this invention to such other fluid systems would be within ordinary skill in the art.

Figure 8:
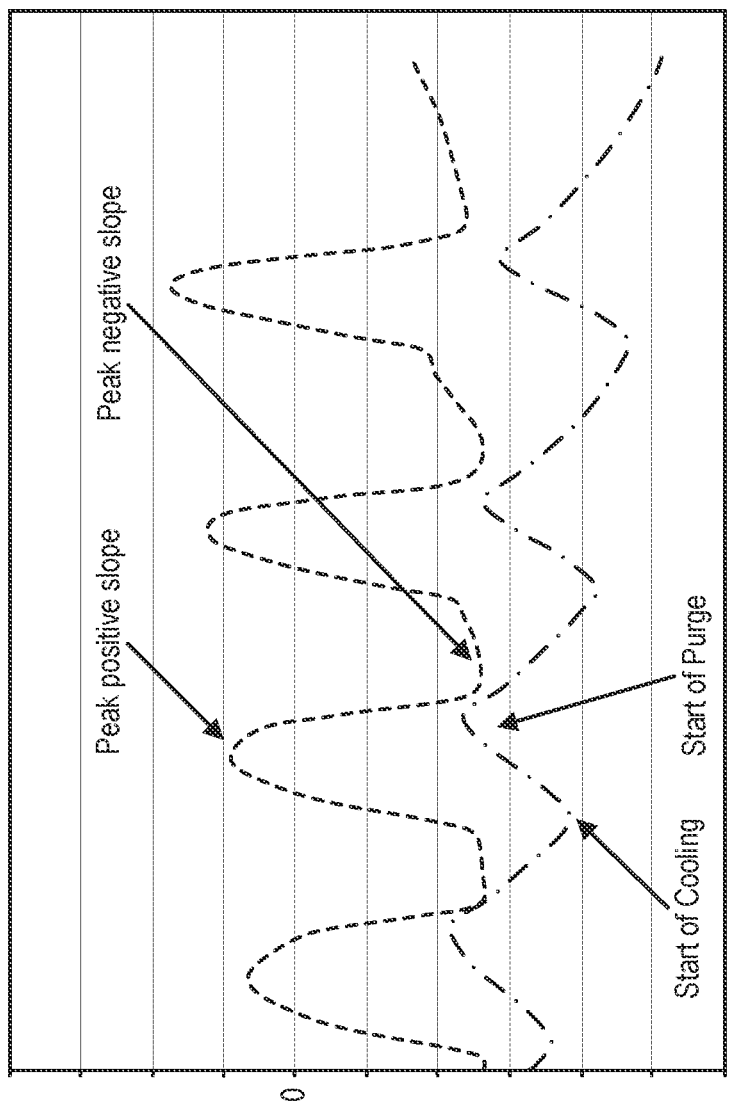
FIG. 8 is a plot of a thermistor reading and its derivative.

Now referring to FIG. 8, which shows a thermistor reading and first derivative (rate of change) of thermistor reading. Cooling. Note that in this plot a higher value of thermistor reading/value means a colder temperature. Also note that the bottom saw tooth like line represents the thermistor measurements and the top line is its derivative.

Figure 9:
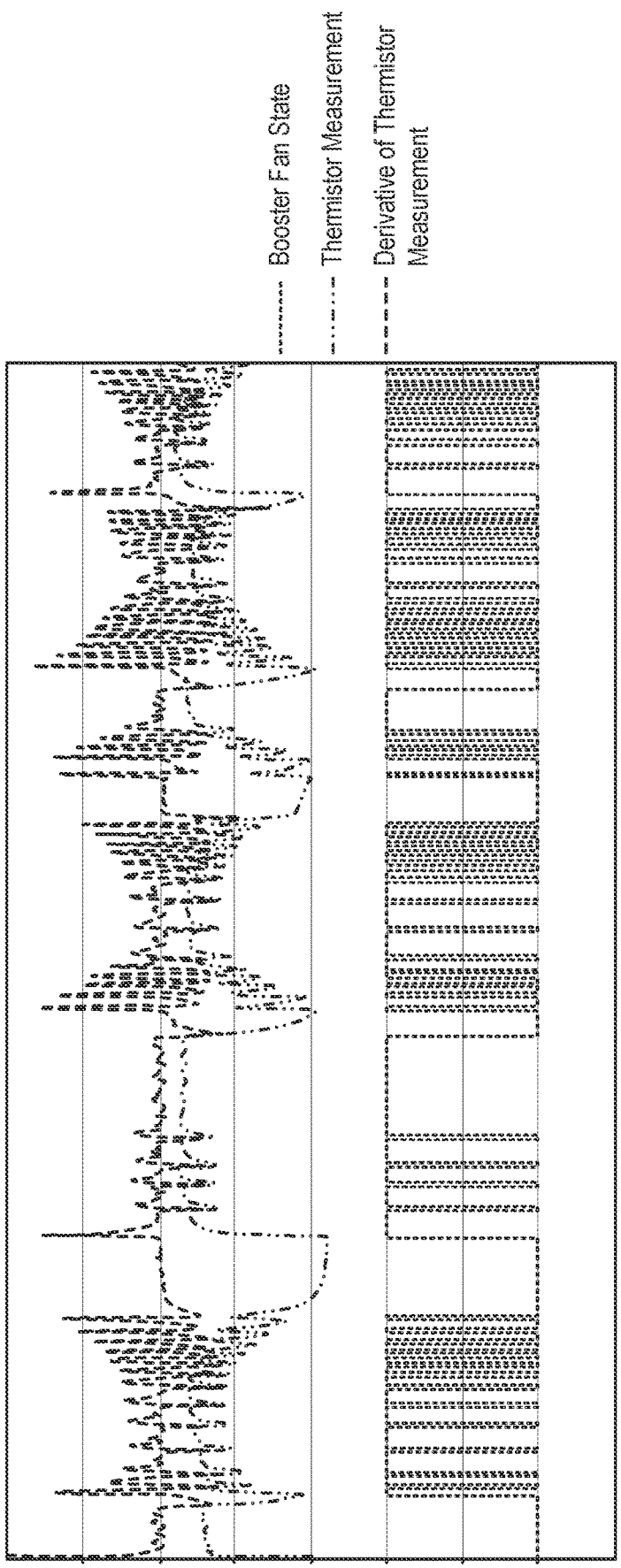
FIG. 9 is a representation of two days of thermistor values (middle) the derivative of the thermistor values (top) and booster state (bottom) all plotted vs a common time line.

Now referring to FIG. 9, there is shown two day of Changes (top lighter colored line) plotted against ADC thermistor values (bottom darker line) during transitions. (Cooling) Also, note in FIG. 8, a higher value of the thermistor reading/value means a colder temperature. The bottom line is the booster fan state.

Figure 10:
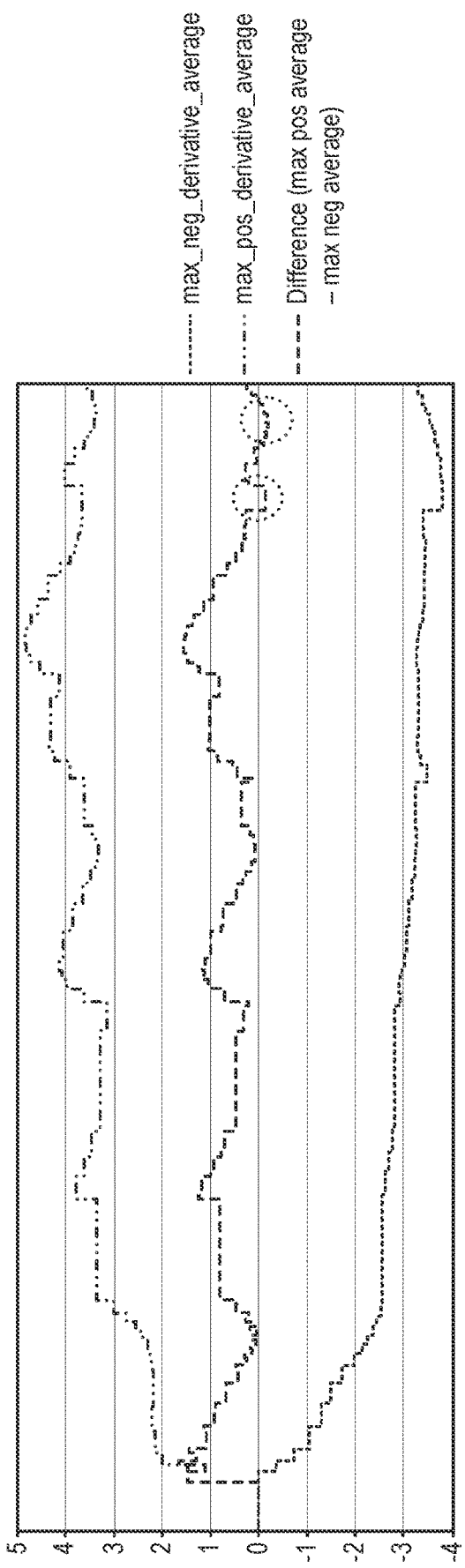
FIG. 10 includes plots of averaging of the peak rates of change over the same period.

Now referring to FIG. 10, there are three lines shown, with the top line representing the maximum positive derivative average, the bottom line representing the maximum negative derivative average; and the middle line being the difference between the two.

Figure 11:
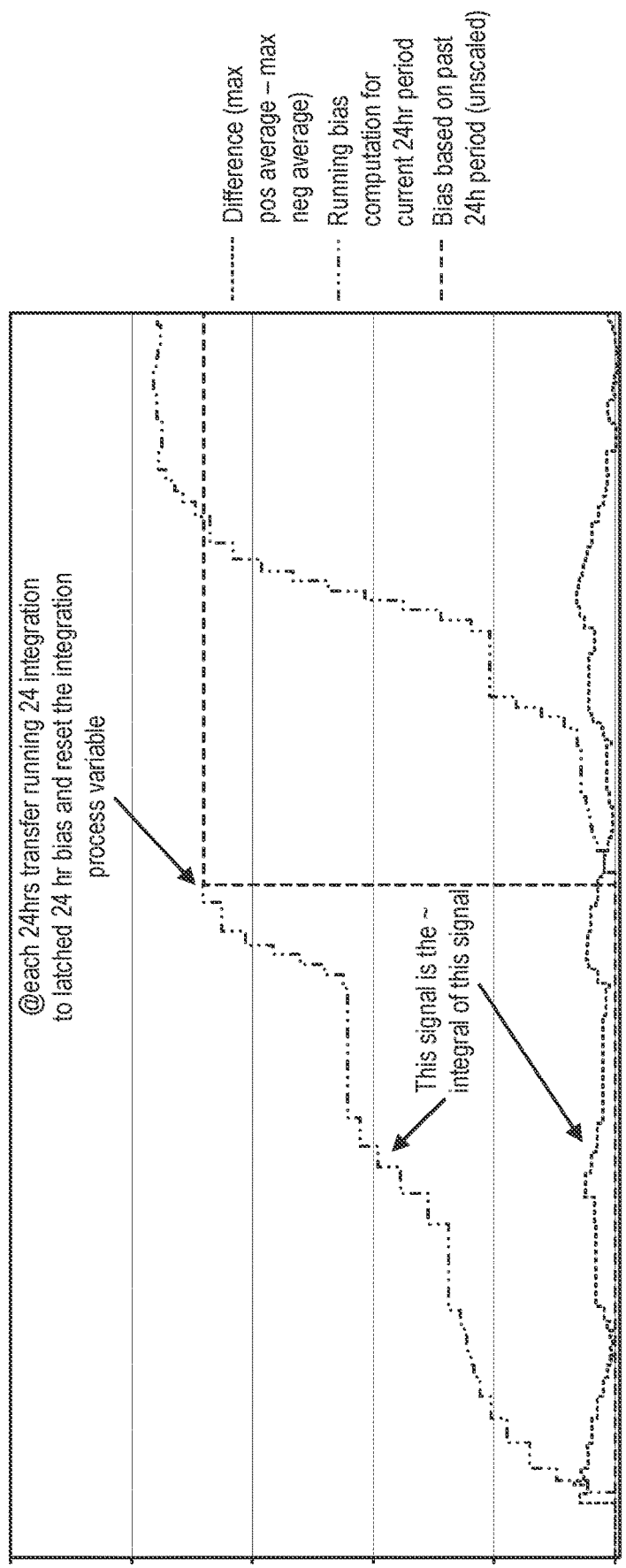
FIG. 11 is an accumulation of bias plot.

Now referring to FIG. 11, there is shown a graph of an accumulation of bias for next 24 hour period (Cooling) The more horizontal line near the x axis is integrated to produce the more increasing stepped line which represents the running bias computation for the current 24 hour period.

Figure 12:
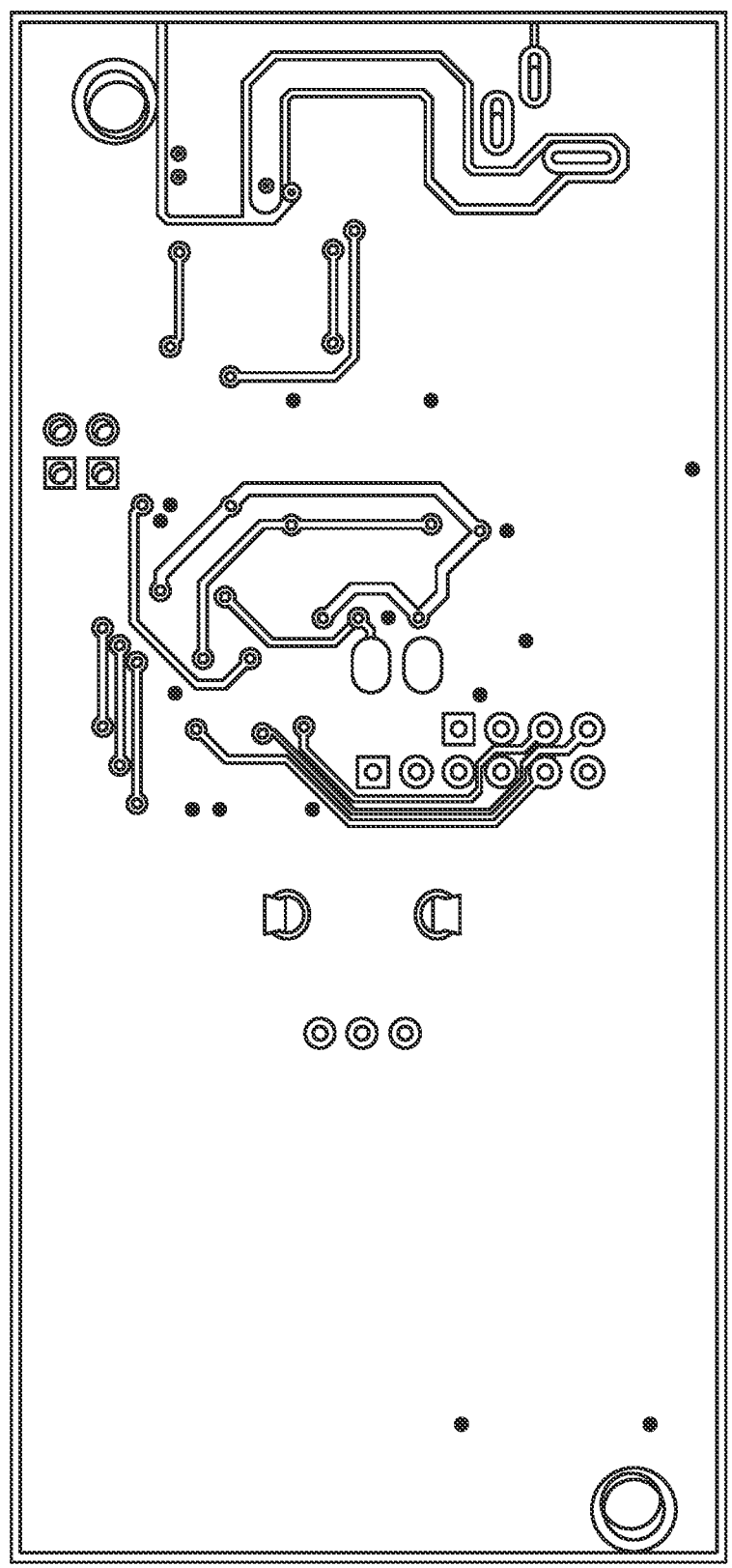
FIGS. 12 and 13 are representations of opposite sides of a circuit board including portions of the detailed schematic diagram of FIGS. 3 and 20.
Figure 13:
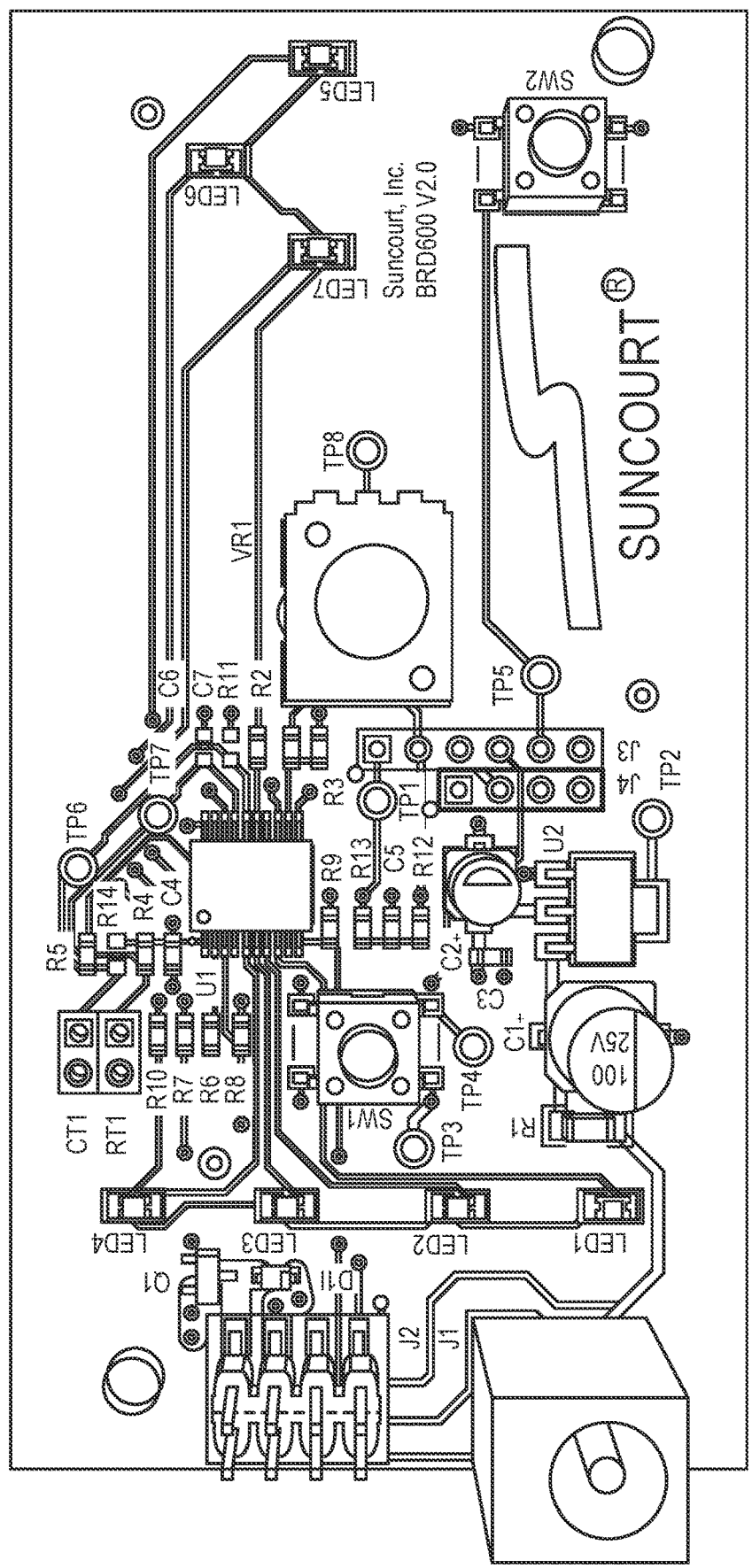
Figure 14:
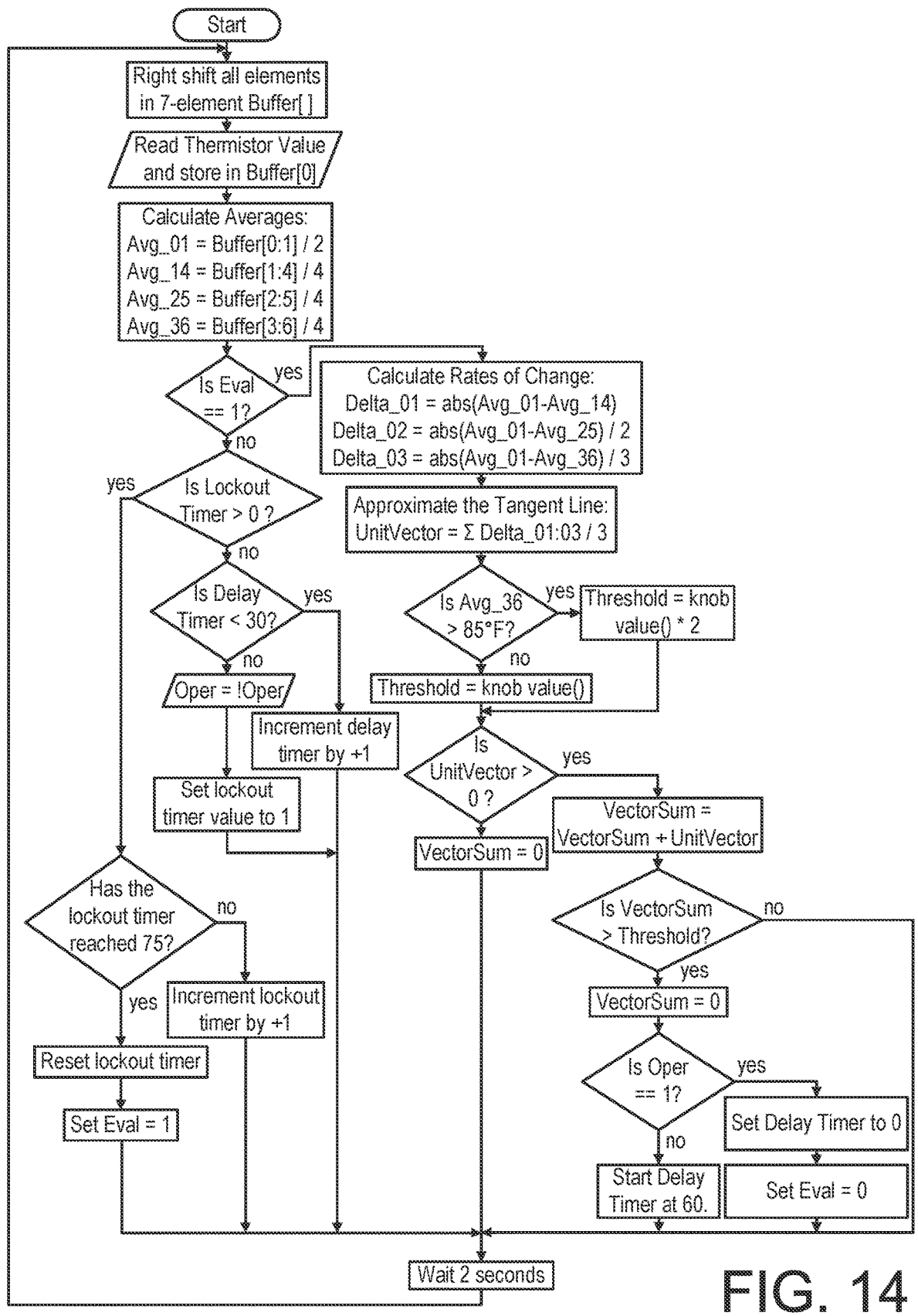
FIG. 14, is a flow diagram for auto-changeover or "auto" mode logic.

Now referring to FIGS. 12 and 13 are front and back sides of a circuit board which embodies the circuitry of FIGS. 3 and 20.

Some of the details and interrelationships of the first embodiment of the present invention may be better understood when referring generally to FIGS. 1-13 and the preceding text and when considered as:

A logic control scheme for a booster (fan or pump) that synchronizes its operation with a fluid distribution system (air or water) in which the temperature of the distributed fluid rises or falls as part of an ordinary system cycle. This rise or fall in temperature is considered an actionable event for the booster apparatus and the booster must respond by starting or stopping its operation. This method uses no temperature setpoint to reference the actuation temperature, nor does it use a fixed deviation from a minimum or maximum system temperature to activate or deactivate the booster. This method requires no calibration cycles but uses "learning" algorithms to improve the operation of the booster based on data gathered during operation. This method monitors the immediate rate of change in system temperature and bases its activation or deactivation on an increased rate of change in absolute system temperature relative to the previously sampled rate. The fluid within a tempered distribution system will necessarily express a rate of change in temperature throughout the system cycle. The rate of change early in the system cycle will be of comparable but opposite direction with respect to the rate of change at the end of the system cycle. In addition, over the course of operation over a day, it is evident that there are typically larger rates of change noted during the start of the blower phase versus purge phases. With the proper analytics in software, this overall difference can be exploited to determine whether the HVAC system is in a cooling versus heating mode and allow for determining whether the system is in blower phase, and to turn on the booster fan, or purge phase and to turn off the fan after some period of time. Also, to avoid any need for threshold adjustments for rate of change detection used to delineate the start of a blower or purge cycle, additional analytics though a histogram of rate of change event magnitudes is used to determine the likely and optimal threshold, independently for positive and negative rate of change peaks, to filter out errant small rates of change in a steady-state system due to shifting ambient conditions as to not cause the booster to inadvertently activate when the fluid distribution system is idle. Thus fully automatic vent booster operation can be achieved in the event of the worst performing vents. Lastly, in the event of loss of synchronization, employing the above methods allows resynchronization to occur and become less frequently the more the product is used.

Note that in the illustrations that the thermistor value reading moves lower for increasing temps and higher for decreasing temps due to the circuitry configuration. This does not affect performance of the invention and not a relevant factor in the claims. The example is a register booster for a forced-air system during cooling season. When the system is idle, the duct temperature at the register booster is either at parity with room temperature, or is slowly increasing toward room temperature since the last cooling cycle ended. Once the cooling cycle starts, the change in temperature accelerates, in this case downward (Thermistor reading increases). The magnitude of this acceleration can be dependent on the elapsed time since the last cooling blower cycle. The register booster responds to this acceleration (change in rate of change) in temperature by starting its fan(s). For a very short interval, the rate of change in temperature accelerates further once the booster fan(s) is (are) introduced to the system since the booster and cooling blower are working in tandem. The duct temperature will then continue to drop, but at a relatively steady rate (little to no acceleration) and eventually reach an apex. Once the cooling blower suspends the imposition of cooling and continues to operate its blower (purge cycle), the duct temperature will increase with an absolute rate of change akin to the rate of change when the duct temperature was climbing toward the apex. Once the purge cycle is over, the register booster's fan(s) is (are) delivering the semi-tempered air without the aid of the blower. The localized duct temperature at the location of the booster fan once again accelerates toward room temperature. This acceleration either during or following the purge cycle causes the register booster to de-activate.

The first embodiment may have applications such as:

Boosting heated or cooled air in a forced-air system—register booster.

Boosting heated or cooled air in a forced-air system—in-line duct booster with built-in controls.

Synchronizing operation with heated or cooled air in a forced-air system—thermostatic power relay for activating any 120V appliance.

In-line, cabinet-mounted, roof or sidewall-mounted ventilation fan for cooling process equipment.

Supplemental branch pump for a boiler-sourced hydronic heat system (e.g.: for a commercial or institutional building expansion project, add a supplemental pump for the new area rather than upsizing the existing pump and distribution piping throughout the existing building).

Supplemental branch pump for a chiller-sourced hydronic cooling system (e.g.: for a commercial or institutional building expansion project, add a supplemental pump for the new area rather than upsizing the existing pump and distribution piping throughout the existing building).

Supplemental branch pump for chilled process water cooling (e.g.: for medical or industrial laser cooling, distillery operations, or data center cooling).

Now turning to the second embodiment of the present invention and to FIGS. 14-19.

This second embodiment was first in time but not presently considered to be the preferred embodiment. Now referring to FIG. 14, or the flow diagram for auto-changeover or "auto" mode logic. This diagram will detail how detection of the beginning and end of either a heating or cooling cycle can be accomplished without any temperature setpoints or seasonal adjustments. ADC values representing the thermistor temperature are stored in a 7-element buffer array. Every two seconds, the thermistor's ADC value is taken and placed into the first element (Buffer[0]) after each of the preceding elements have been shifted to the right. Buffer element [0] will always contain the most recent value and Buffer element [6] will contain the temperature as of 12 seconds prior. Next, averages are taken of four six-second intervals each two seconds older than the last. Avg_14 contains the average value of Buffer elements [1] thru [4], Avg_25 contains the average value of Buffer elements [2] thru [5], and Avg_36 contains the average value of Buffer elements [3] thru [6]. Unlike the other three variables, Avg_01 only contains the average of two values, Buffer[0] and Buffer[1]. This was done to give the most recent average more freedom to veer from A nominal value while the other three averages are more decidedly stable. Unsigned integer values are used here rather than floating point variables to preserve program memory space and to use an otherwise unfavorable characteristic of integer math to our program's advantage. Since these are integer values in the microcontroller, decimal portions resultant from multiplication or division are truncated or rounded down. Each average is calculated as the sum of all four elements divided by four, or both elements divided by two in the case of Avg_01. These thermistor samples and averages are collected and calculated regardless of whether or not the mode logic that follows is allowing further evaluation or not.

Figure 15:
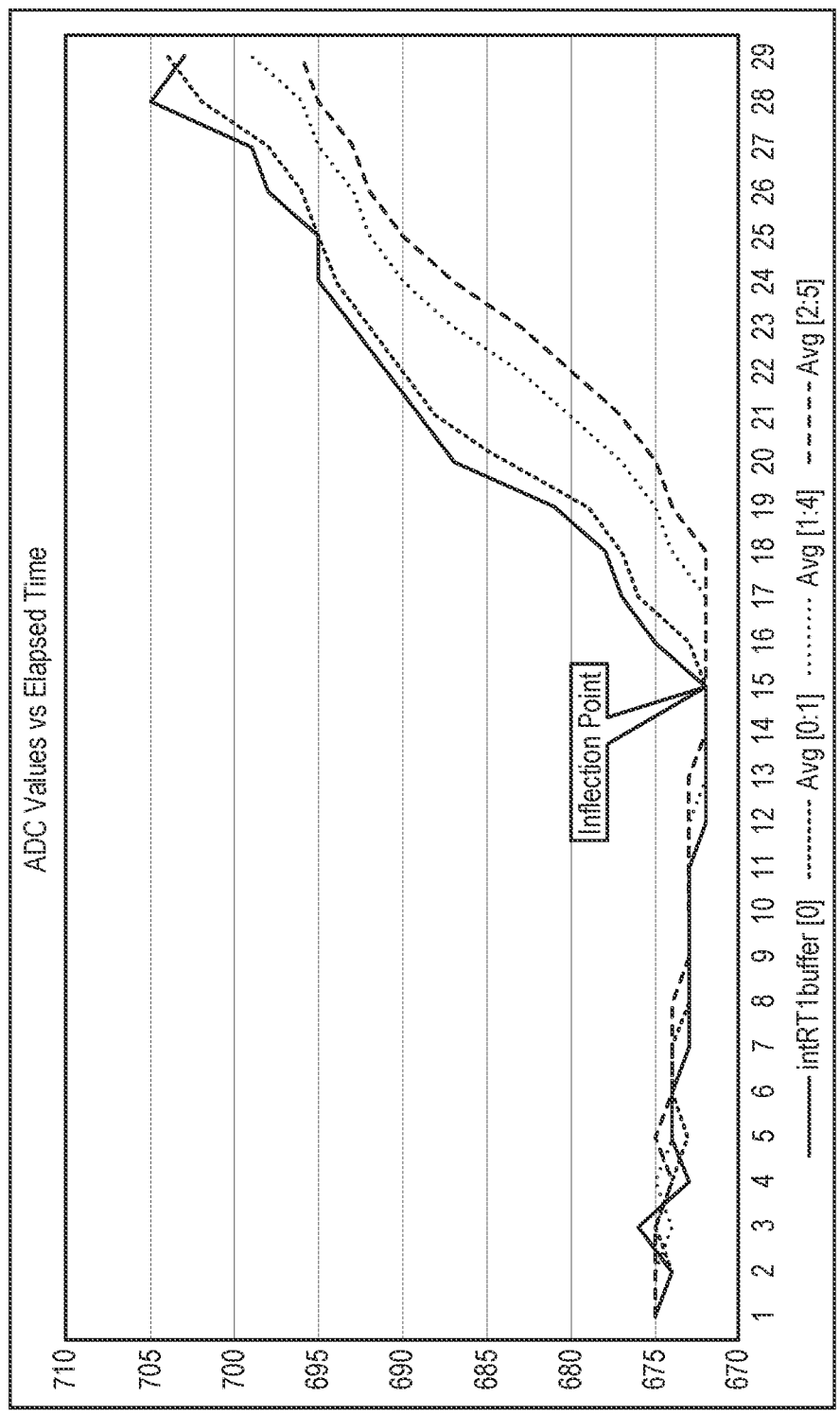
FIG. 15 shows the most recent temperature ADC value stored in element [0] alongside the three calculated average interval values.

FIG. 15 shows the most recent temperature ADC value stored in element [0] alongside the three calculated average interval values. Prior to the inflection point, the three average values do not diverge from element [0] or one another in the y axis to any significant degree. After the inflection point, this is no longer the case. There is a noticeable difference in the y axis values of all four curves for any given x on the graph.

Next, the logic must determine whether or not the flag for evaluation has been set. If so (Eval==1), then the logic is free to detect the temperature transitions and process them. If not (Eval==0), then the detection logic is ignored while the microcontroller executes a detection lockout or delayed off countdown.

The first step in evaluating the temperature is to calculate the rate of change in three different intervals all originating from the most recent average. Delta_01 equals the absolute difference in Avg_01 compared to Avg_14, two seconds later. Delta_02 equals the absolute difference between Avg_01 and Avg_25 (4 seconds later) divided by two. Delta_03 equals the absolute difference between Avg_01 and Avg_36 (six seconds later) divided by three. Here we have three different intervals all approximating the rate of change over a two second interval in the most recent section of the temperature ADC curve. Each of these three values are tantamount to the difference quotient or slope of the secant line along the temperature curve. Averaging these three values together forms a loose approximation or the slope of the line tangent to the temperature curve. This is better known as the derivative or the measure to which the rate of temperature change is increasing (accelerating) or decreasing (decelerating) at a given point on the graph.

Figure 16:
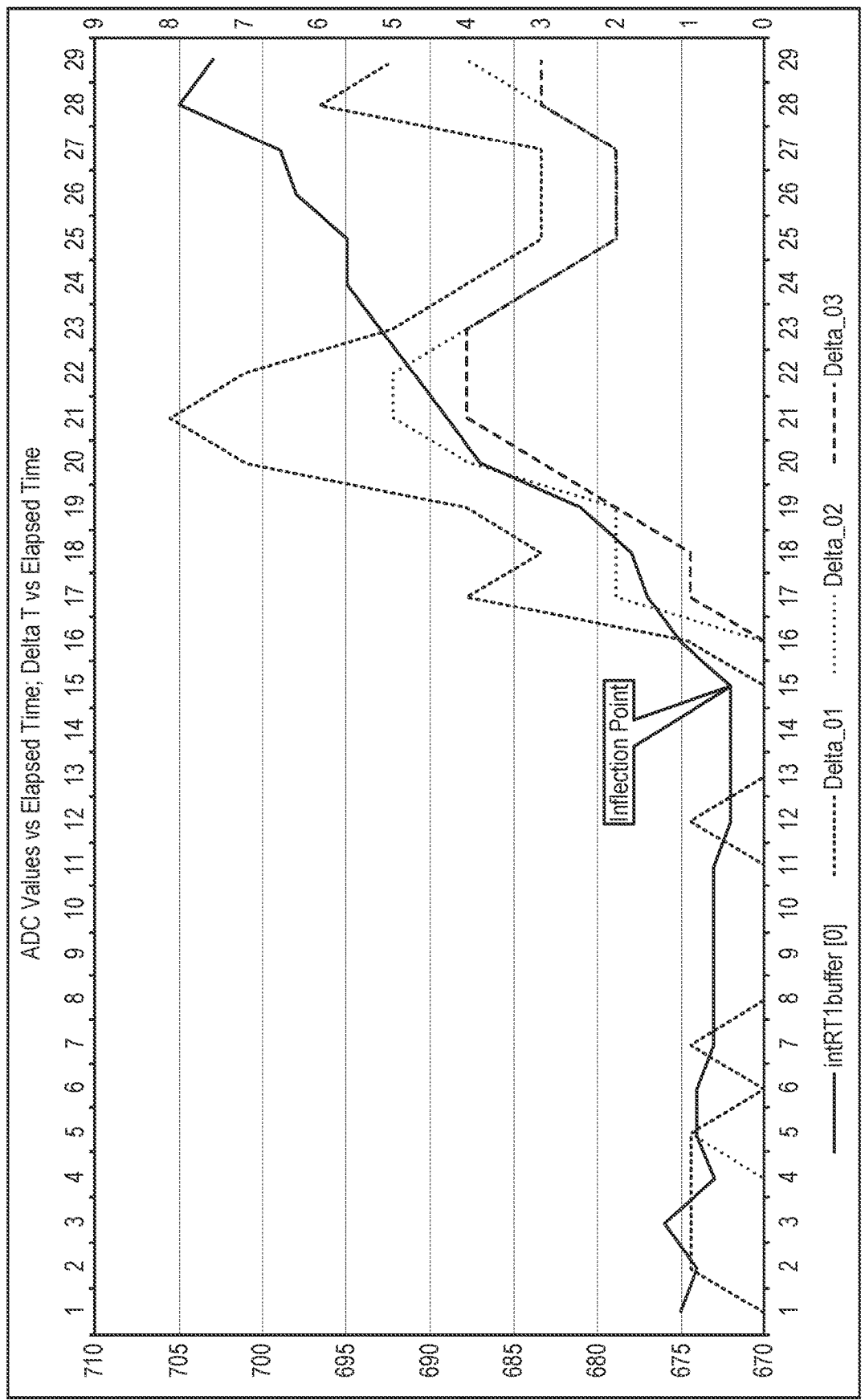
FIG. 16 is a plot of Delta_01, Delta_02, and Delta_03 separately on a secondary axis against the temperature curve.

Referring to FIG. 16, if we plot Delta_01, Delta_02, and Delta_03 separately on a secondary axis against the temperature curve, it can be observed that Delta_01 has the largest magnitude. This is due to the fact that the elements that comprise Delta_01 are bourne of the most recent averages, or Avg_01 and Avg_14. The difference in magnitude is further affected by the calculations for each Delta due to the truncation of the decimal remainder. While one would expect these three Delta values to appear identical but shifted in time by one unit on the graph, we will use the discrepancy between the three values as an error-rejection method as noted below. A second observable characteristic of this graph is that Delta_01, Delta_02, and Delta_03 only develop significant magnitudes (>1) after the temperature inflection point. Prior to this, only Delta_01 is showing any activity during the small transitions in temperature with Delta_02 registering a value only once, at x=5 on the graph. After the inflection point, the instantaneous ADC value begins its climb and all three Delta values are charting with each Delta_01, Delta_02, and Delta_03 showing a delayed response with respect to the temperature curve.

Figure 17:
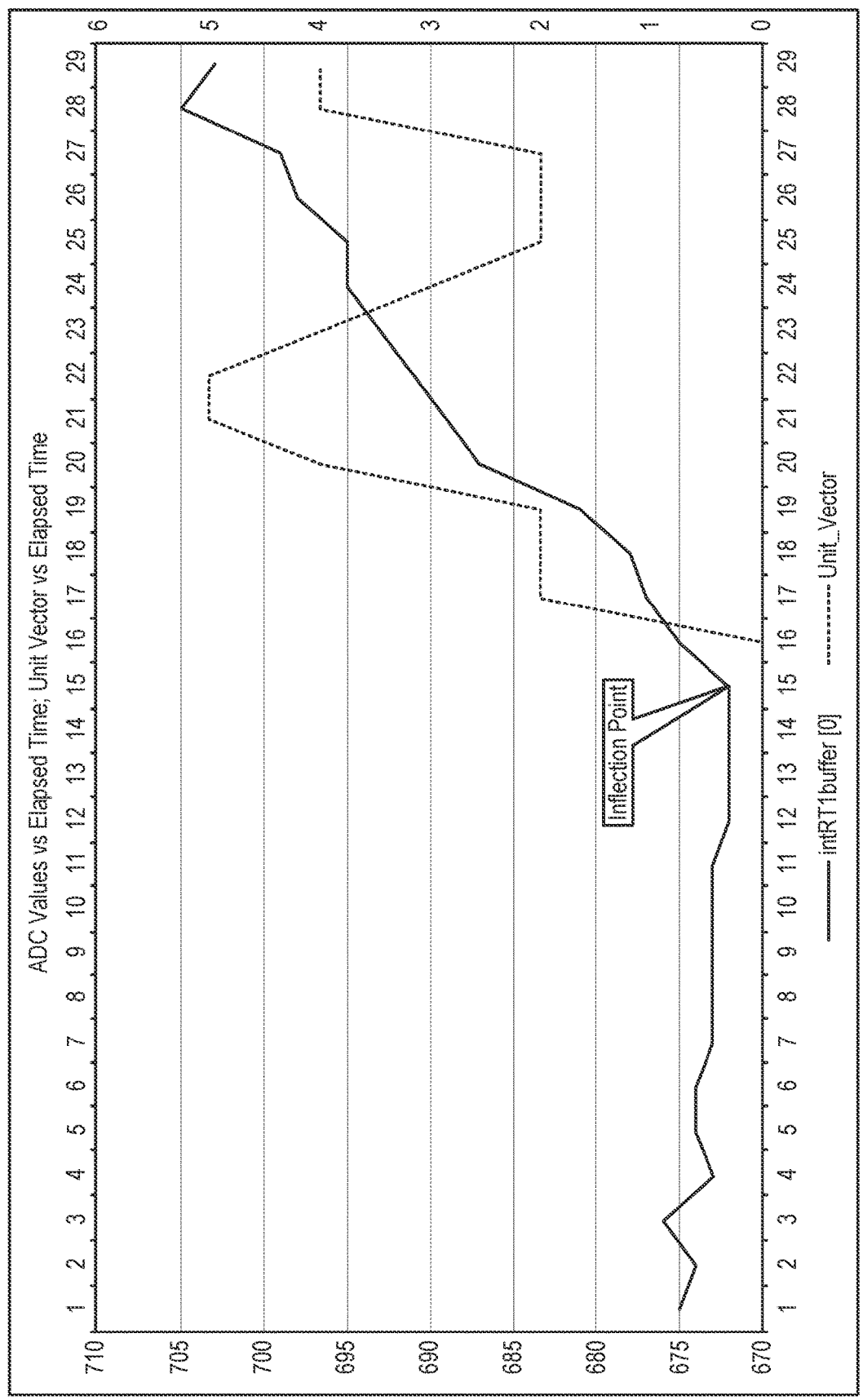
FIG. 17 shows the same data as FIG. 16 except that Delta_01, Delta_02, and Delta_03 have been averaged together.

FIG. 17 shows the same data as the prior figure. However, Delta_01, Delta_02, and Delta_03 have been averaged together. In the flow diagram, this average value's calculated variable is noted as the "Unit Vector." Here, we are using the integer rounding errors imparted by the eight-bit microcontroller to our advantage. It can be observed that the small temperature transitions prior to the inflection point no longer manifest as a magnitude along the Unit Vector line. To use the point x=5 on the graph as an example, Delta_01=1, Delta_02=1, and Delta_03=0. The average of the three values, (1+1+0)/3 is 0.667. But the microcontroller will round the quotient down to zero since the decimal remainder is truncated. Along the entirety of the temperature cycle curve, this rounding will help to prevent small changes in temperature rate of change from registering a value for the Unit Vector at these points along the x axis.

Figure 18:
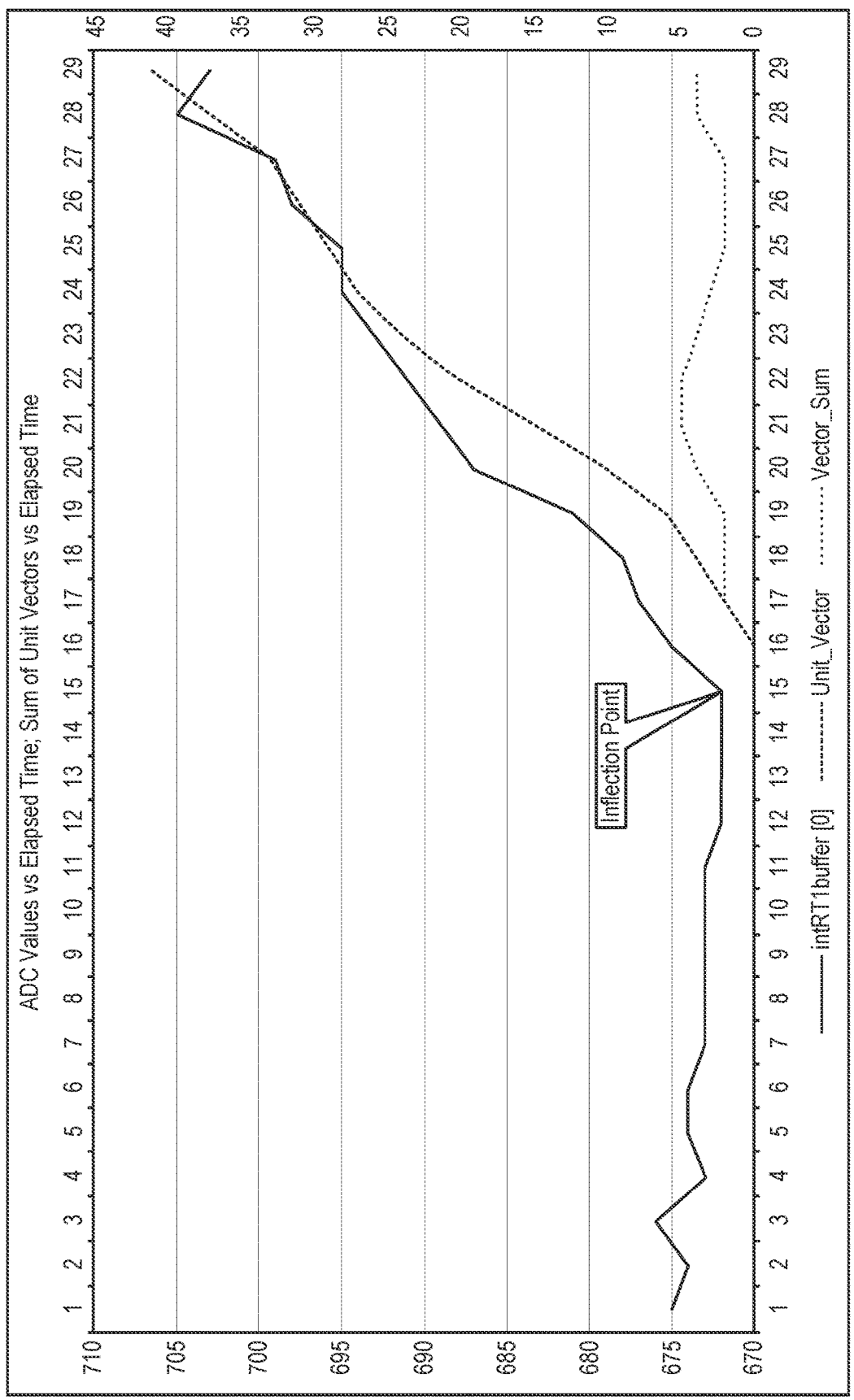
FIG. 18 shows the Unit Vector plotted alongside the Vector Sum which is a rolling sum of Unit Vectors where {Unit Vector>0}.

FIG. 18 shows the Unit Vector plotted alongside the Vector Sum which is a rolling sum of Unit Vectors where {Unit Vector>0}. The Vector Sum provides a much greater magnitude in value with which to compare to a threshold.

Figure 19:
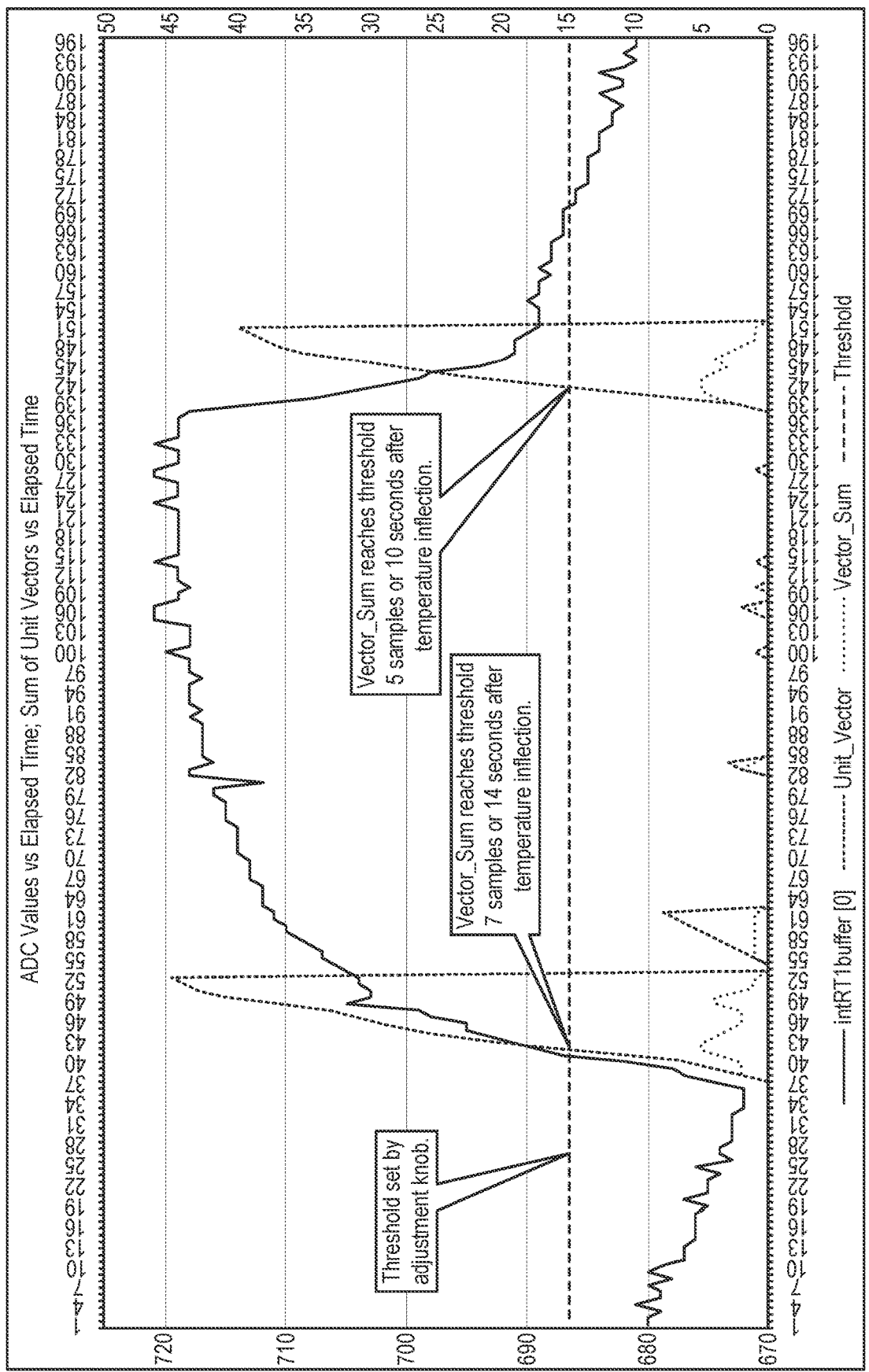
FIG. 19 shows an entire Air Conditioning cycle with the instantaneous ADC value (intRT1[0]), the Unit Vector, and the Vector Sum.

FIG. 19 shows the entire Air Conditioning cycle with the instantaneous ADC value (intRT1[0]), the Unit Vector, and the Vector Sum. Additionally, a threshold is shown on the graph. Since the Delta_01, Delta_02, and Delta_03 values that comprise the Unit Vector average are calculated as the absolute difference between the underlying average rate of change values, both acceleration and deceleration express positive values for the Vector Sum. This allows the logic to detect the beginning and the end of the forced-air cycle with a universal block of code. The structure of the code is applied universally to both detections, however, accurate sensing for both heating and cooling does require an additional qualifier as well as adjusted thresholds in the code.

Referring back to FIG. 14, after the Unit Vector is calculated, the code must now make an adaptation to the comparison logic depending on the temperature. Cooling and Heating systems have inherently different temperature characteristics throughout a typical cycle. Between peak and steady-state duct temperatures, a gas heating cycle can have a change in temperature twice that of a cooling cycle. Additionally, due to the larger magnitude of the heating curve, the smaller transients that were otherwise filtered out by truncation of integer math do express non-zero values in the logic during a heat cycle. Avoiding a false detection error from one of these transient detections in heating requires a higher threshold for the Vector Sum comparison. A threshold of this higher value may be too large to register a detection during the cooling cycle. So different thresholds must be used depending on the operating temperature of the system. Rather than requiring the end-user to make these adjustments, they can be addressed by the logic. The end-user may in fact adjust this threshold by use of a manual knob. But the logic will use this actual knob value as the threshold during lower operating temperatures and will multiply the knob value by two when operating temperatures are higher. To determine the operating temperature, the logic will use the Avg_36 value since it is the least recent representation of the system temperature. It will compare the Avg_36 value to an ADC value representing, for example, 85 degrees Fahrenheit to determine how to handle the threshold as outlined above. If the system temperatures are >85° F. or so, the code will adjust parameters for heating. Otherwise, parameters for cooling will be used. The threshold in this example of 85° F. was chosen to allow heat pump systems to benefit from this method. In lieu of a gas furnace, a heat pump can be used as the primary heat source in a forced-air system. Since a heat pump is ostensibly an air conditioner operating in reverse with respect to the evaporator and condenser coils, a heat pump's cycle will have a temperature curve more similar to an air conditioner although shifted towards 'warmer' values on the graph. The more stringent evaluation criteria associated with a heat cycle by the logic will not reliably detect the beginning or end of the heat pump cycle. By using approximately 85 degrees Fahrenheit as the basis for which sets of criteria the logic will evaluate, the heat pump temperature cycle will be more accurately detected using parameters for cooling. Notwithstanding supplemental electric heat, heat pump systems typically won't reach the example temperature of 85 degrees Fahrenheit in the airstream. Or at least, the actionable points on the graph for a heat pump system will be below this example threshold.

Irrespective of how the logic can ascribe cooling or heat pump performance from the system's temperature characteristics, Unit Vectors>0 can be added to the accrued Vector Sum value. If the Unit Vector is 0, the Vector Sum is reset to 0. The Vector Sum will accumulate or reset its value throughout the forced air cycle. While below the threshold, the logic will wait two seconds before taking a new temperature sample and then re-evaluate. If the Vector Sum does cross the threshold, the first action by the logic is to reset the Vector Sum to 0 so that it will not begin its next evaluation containing an accumulated total. What transpires next depends on the operating status of the booster fan(s). If the fan(s) is (are) running at the time of detection (Oper==1), this would indicate detection of the end of the cycle. If the fan(s) is (are) not running (Oper==0), then this would indicate detection of the beginning of the forced air cycle.

If the end of the cycle is detected, an 'off delay' is initialized by setting its value to 0. The flag for evaluation is also set to 0 to prevent further temperature evaluation during this delay. Most forced air systems will have a "purge cycle" once the thermostat calls for an end to the current operation. During this "purge", the heating or cooling source ceases, but the central blower continues to operate for 45 to 60 seconds. It is most often during this "purge cycle" that the logic will detect the change in temperature commensurate with the end of the forced air cycle. A delay is added so that the booster fan(s) does (do) not stop before the central blower. The delay variable is iterated once every other second until a value of 30 is reached. After which, the fan(s) will be de-activated.

If the beginning of the cycle is detected, the logic will forego the delay and activate the fan(s) immediately. In either case, be it the start or end of the cycle, the logic will implement a lockout timer after the fan(s) is (are) toggled (Oper=!Oper). This timer will lock out any further temperature evaluation until 150 seconds have elapsed. This is a precautionary measure to prevent temperature changes that may still be present following the change in state of the fan(s) from triggering the detection of acceleration in the logic. This phenomenon is more prevalent after the booster fan(s) is (are) turned on since the logic is detecting the early stages of the rate of rise/fall in temperature and this rate may also be affected by the imposition of the booster fan(s) itself (themselves). This evaluation lockout isn't as necessary once the booster fan(s) turn off following the delay at the end of the forced-air cycle, but 150 seconds is not a long enough time period to impede detection of a subsequent forced air cycle. Subsequent cycles are often limited by the thermostat to no less than five minutes after the end of the previous cycle. Once the lockout timer has elapsed, it is reset and the flag for evaluation is once again set to 1 to enable the auto-changeover temperature logic.

It is important to also note that while this descriptions of two embodiments each describes a HVAC booster fan they are also applicable to fluids other than heated or cooled air, e.g. heated or cooled liquids pumped to remotely located radiators etc. The application of this invention to such other fluid systems would be within ordinary skill in the art.

The precise implementation of the present invention will vary depending upon the particular application.

It is thought that the method and apparatus of the present invention will be understood from the foregoing description and that it will be apparent that various changes may be made in the form, construct steps and arrangement of the parts and steps thereof without departing from the spirit and scope of the invention or sacrificing all of their material advantages. The form herein described is merely a preferred and/or exemplary embodiment thereof.

We claim:

1. A method of improving performance of a distribution system of thermally altered fluid, comprising the steps of:
   providing a device configured for causing thermally altered fluid to move more quickly at a location in said distribution system;
   providing a temperature sensor for sensing a temperature characteristic of said thermally altered fluid at said location;
   wherein said device is configured to turn off in response to a determination that a change in a rate of change of said temperature characteristic has occurred; and
   in response to using filtered peak rate of change for stable instantaneous system estimation.

2. The method of claim 1 wherein said step of providing a device further uses a 24-hour bias application feature.

3. The method of claim 1 wherein said step of providing a device further uses detecting negative and positive peaks to compute ave max positive d'T/dt and ave max negative d'T/dt.

4. The method of claim 1 wherein said determination of whether a change in a rate of change of said temperature characteristic is determined by a programmable device, receiving data from said temperature sensor.

5. The method of claim 4 where the programmable device is a microcontroller unit coupled to said temperature sensor and is used to filter temperature samples to help remove ambient temperature change variants.

* * * * *